United States Patent [19]
Gerry

[11] 3,808,571
[45] Apr. 30, 1974

[54] SELF LOCKING SOLENOID

[76] Inventor: Martin E. Gerry, 13452 Wihthrope St., Santa Ana, Calif.

[22] Filed: June 29, 1973

[21] Appl. No.: 375,004

[52] U.S. Cl.............................. 335/253, 335/254
[51] Int. Cl............................................. H01f 7/08
[58] Field of Search............ 335/253, 254; 251/129

[56] References Cited
UNITED STATES PATENTS
| | | | |
|---|---|---|---|
| 1,433,952 | 10/1922 | Kendall........................... | 335/253 |
| 2,916,677 | 12/1959 | Hess................................. | 335/253 |
| 3,349,356 | 10/1967 | Shinohara....................... | 335/254 |

FOREIGN PATENTS OR APPLICATIONS
| | | | |
|---|---|---|---|
| 844,337 | 8/1960 | Great Britain.................... | 335/253 |

Primary Examiner—George Harris

[57] ABSTRACT

A self locking solenoid is provided by this invention. The solenoid has a magnetizable member which is responsive to a magnetic field to provide translation action of the magnetizable member. A coil circumjacent to a portion of the magnetizable member is used to provide the magnetic field when energized. Components that are responsive to the magnetic field are also provided for unblocking the path of translation of the magnetizable member in order to permit its translation when a field is present or to block the path of its translation when no field is present.

Other components are included to provide mechanical bias to the magnetizable member and to the components that block the path of translation as well as components to seal against liquid inflow into the solenoid when used for controlling water or other liquid distribution systems.

10 Claims, 5 Drawing Figures

SELF LOCKING SOLENOID

PRIOR ART

The field of this invention is generally electromagnetically actuated solenoids. The specific field is where such solenoids are used to control liquid flow, principally in water or other liquid pipe distribution systems.

Whereas solenoids are common in prior art, and are known and used in liquid distribution systems wherein pipes are utilized as means for distribution of liquids, such as water, such solenoids, controlled by external controlling means, are somewhat unreliable, expensive due to heavy spring loading construction, and inefficient in that they require very substantial amounts of power or energy to activate them. The high degree of power required is manifested by virtue of the heavy spring loading used in order to maintain in closed position a water or other liquid inject port when the solenoid is not energized and shut-off of liquid flow is desired.

Consequently, in order to overcome the large amount of built-in bias due to this loading, a large amount of power is demanded over the period of time necessary to energize the solenoid and maintain the port open for the liquid to flow. This requires a very substantial amount of current drain imposed upon the controller, such as a timer, for these solenoids, for more than one at a time are usually used for any one system, in addition to the sluggishness exhibited by any one of these solenoids individually.

SUMMARY OF THE INVENTION

Hence, according to the invention, the disadvantages of prior art solenoids are overcome.

The principal objective to be met is enable closure of the water inlet port to be maintained by the solenoid armature or magnetizable member by means of components attached thereto.

The maintenance of such closure, not dependent upon heavy spring loading of the armature, is by means of a pivotable bar member that blocks the travel of the solenoid armature, maintaining closure of the port when the solenoid is deenergized. This pivotable bar is activated by a hinged and tapered member with which the bar is activated by a hinged and tapered member with which the bar cooperates to swing the bar away from the axis of the solenoid and hence unblocks the armature when the solenoid is energized. The self-locking or unlocking feature is achieved by the different masses of the armature and the components mounted thereon and the bar member together with the hinged tapered member, the latter combination being of comparatively low mass compared with the former, exhibits low moments of inertia on a comparative basis. Upon activation of the solenoid, the bar and hinged member will repond first followed by the armature and its components, due to the difference in moments of inertia, and therefore the same field created by virtue of energizing the coil of the solenoid will perform the lock-unlock function as well.

Consequently, no heavy springs are required to hold the armature in place so as to cause the port closing member it carries to shut off the fluid, as the bar member will do this without the need of spring loading, of the heavy variety. Very light springs, compressed of their own accord when the solenoid is deenergized, will expand to give a slight assist to the armature to return it to its normally inoperative and closed position, but the magnitude of energy developed in these springs are extremely low compared to conventional spring loading.

Briefly, a self locking solenoid comprises in combination a magnetizable member which is responsive to a magnetic field for providing translation of the member. A coil circumjacent at least a portion of the magnetizable member is provided for impressing a voltage thereon to create the magnetic field. Means which are responsive to the magnetic field for unblocking the path of translation of the magnetizable member are provided in order to permit the translation of the magnetizable member or for blocking it or its path of translation when the coil is deenergized. The means that is responsive to the magnetic field comprises a first means which is also responsive to the magnetic field and a second means which is in cooperative relationship with the first means, the first means providing pivotal translation of the second means thereby unblocking the path of translation. Included is a first bias means attached to the magnetizable member for returning the magnetizable member to its pre-operative location when the coil is deenergized, and a second bias means which is attached to the second means for creating return action of the second means to its pre-operative position upon deenergizing of the coil so as to provide blocking of the path of translation of the magnetizable member.

The first bias means may be a pair of springs normally compressed when inoperative, but when the field acts upon the magnetizable member the springs are expanded, and return to normal pre-operative position is accomplished by energy already stored in the springs due to the magnetizable member or armature lift, so no additional energy is lost on return action.

The second bias means may consist of at least one spring which is expanded by action of hinged member upon the pivotable bar prior to armature lift, and due to magnetic field created. Again, here the return to its normal blocking position is without loss of energy, as the energy has already been stored in these springs when the magnetic field activated the hinged member and swung the bar to clear the path of translation for the armature or magnetizable member.

It is therefore obvious that during the time the mechanical energy or bias was stored in the relatively weak springs, such storage was accomplished during the period of time when the magnetizable member was not being translated, and once the hinged member and bar were moved, no further energy demand was being made upon the power supply used to activate the coil of the solenoid, and also no power or energy, mechanical or otherwise, is used in the instant device, when the solenoid is deenergized, contrary to the conventional solenoids for this application that utilizes extremely heavy spring loading in the inoperative or closed port mode, with attandent high demand for power to overcome this loading upon reenergizing of the solenoid being necessary in the extremely heavy spring loaded solenoids, and being unnecessary in the instant disclosed solenoid.

EXEMPLARY EMBODIMENT

Figure 1:
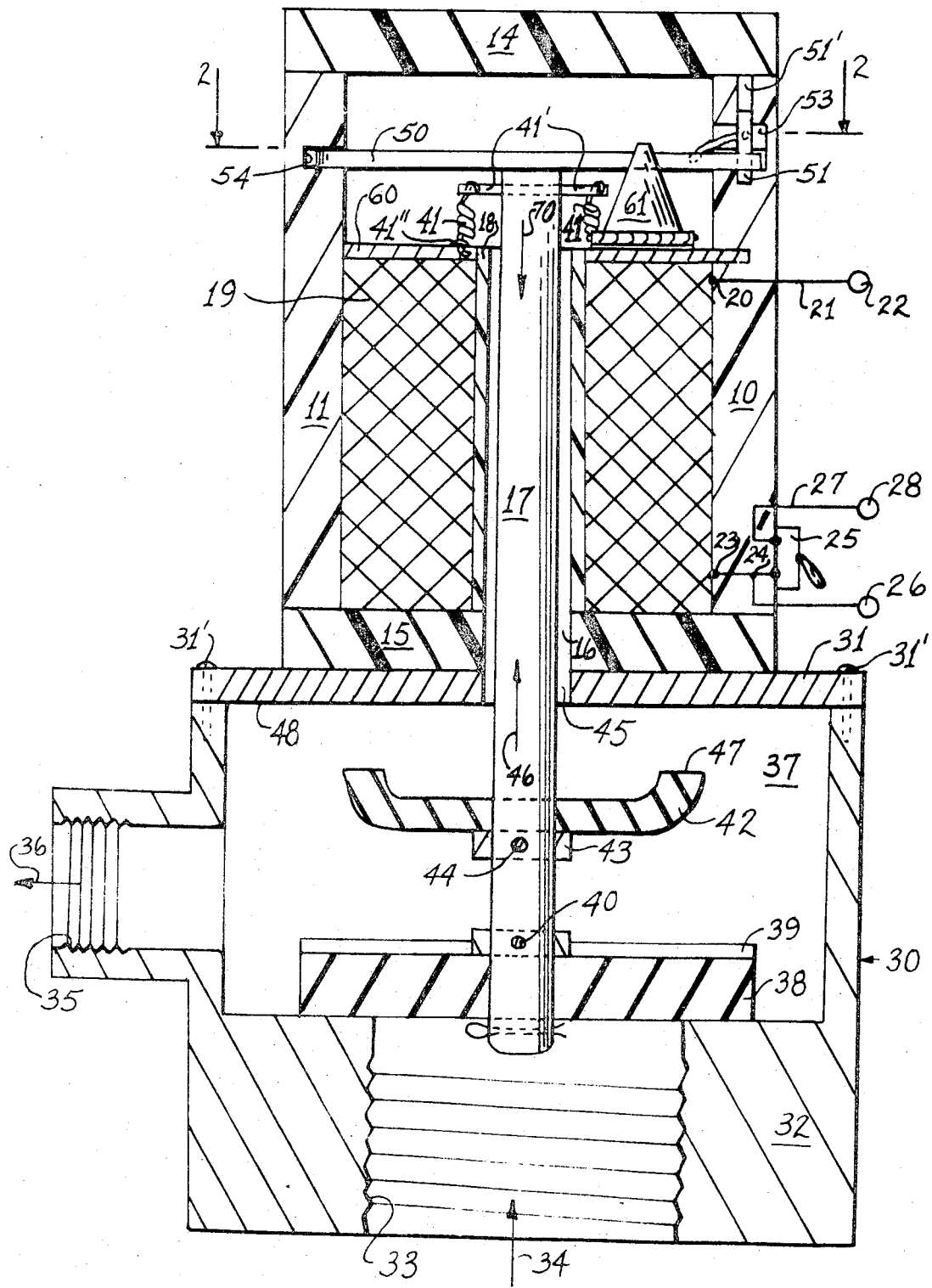
FIG. 1 is a cross section view partly in elevation taken along plane 1—1 of FIG. 2 showing the major parts of the inventive solenoid.

Referring to FIG. 1, the solenoid is shown assembled with a valve chamber of the type that may be used to control water to a set of lawn sprinkler heads.

Figure 2:
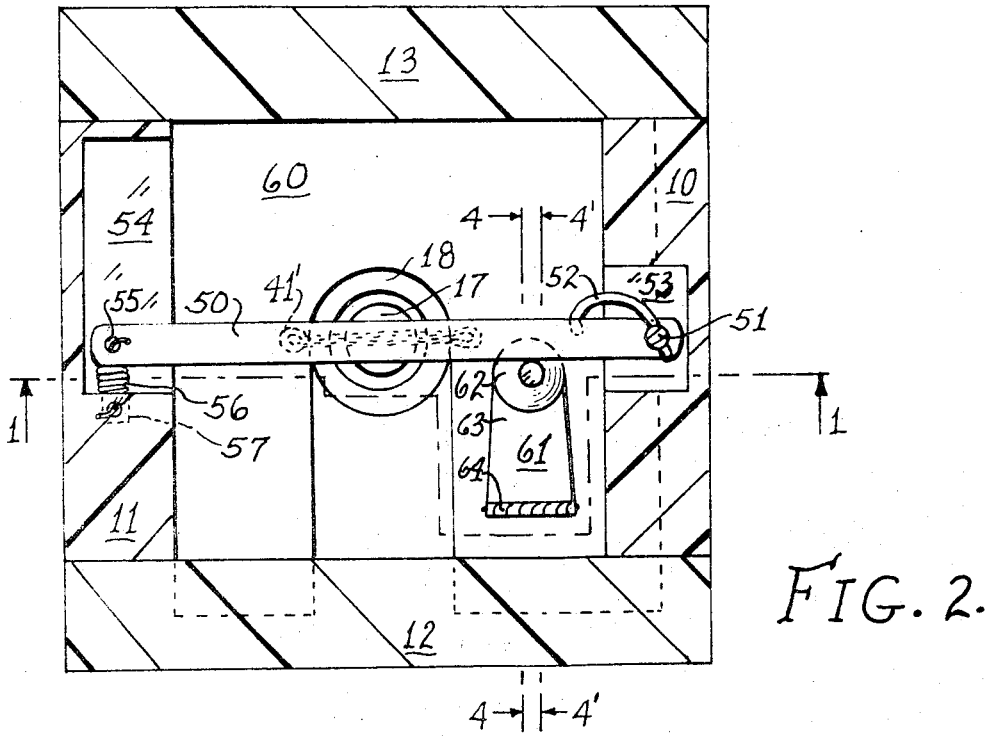
FIG. 2 is a cross section view taken along plane 2—2 of FIG. 1 showing the pivotable bar and the bar transfer means in their normally inoperative mode, so that the pivotable bar locks the solenoid armature in place preventing upward motion thereof in the inoperative mode and hence assuring that the valve member mounted on the armature will be maintained in the position of keeping the valve chamber closed.
Figure 3:
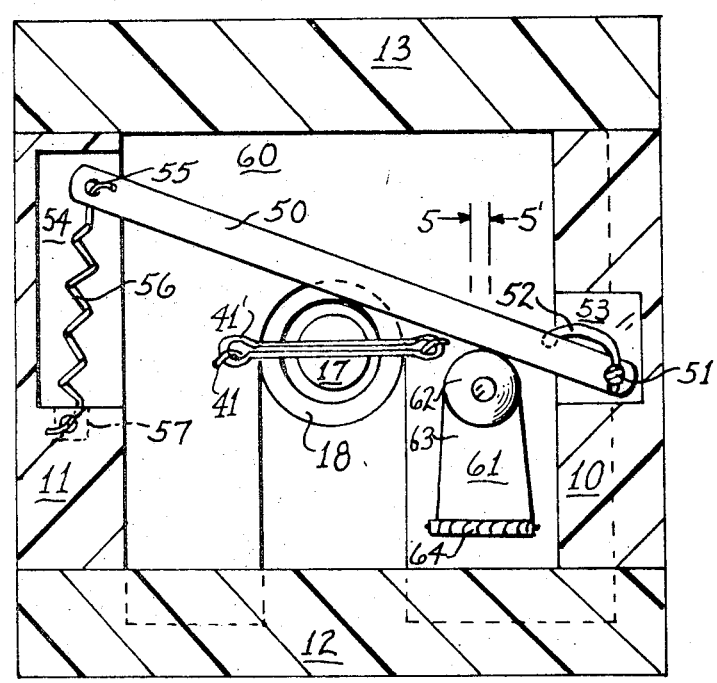
FIG. 3 is the same cross section view as that of FIG. 2 except that the pivotable bar and the bar transfer means are in their operative modes, the bar transfer means having moved the pivotable bar, by magnetic field influence due to operation of the solenoid, so as to permit the solenoid armature to move upward and thereby open the valve chamber to admit water therein.

Referring to FIGS. 1, 2 and 3, the solenoid is comprised of a rectangular type of cavity having side walls 10, 11, 12 and 13, upper cover 14 and lower cover 15. Side walls 10, 11, 12 and 13 are attached to each other mechanically or may be molded forming a rectangular cavity in which the several solenoid parts are housed. Lower cover 15 is attached at the lower end of the cavity formed by the side walls, to the side walls and has an opening 16 at the center thereof for permitting one end of solenoid armature 17 to extend externally of the cavity. Armature 17, when operated, travels in a cylindrical housing 18. Housing 18, the sidewalls, the lower and upper covers are all made of electrically insulating material such as plastic. Armature 17, however, having to be magnetized will be made of a magnetic material such as soft iron. Housing 18 has coil 19 wound thereon and occupying the remaining space between the housing and the sidewalls internal the cavity. Coil 19 is terminated at 20 to which termination is connected a lead 21 extending through sidewall 10 and a solder lug 22 at the end of lead 21 is provided for making external connection to a common power source return. The other end of coil 19 is terminated at 23 to which is connected lead 24. Lead 24 is connected to one side of a single pole single throw switch 25 and to solder lug 26 for making external connection to a timer controller that supplies power to the solenoid from a power source. Switch 25 has a lead 27 connected to solder lug 28 for making connection to the high or other side of the power source. The leads connecting to switch 25 and lead 21 may be molded internally to sidewall 10. The purpose of switch 25 is to by-pass the timer controller that may be connected between terminals 22 and 26 so as to make the solenoid operative at whatever point in time desired by closing switch 25 so as to energize coil 19. Otherwise, the external timer controller will provide power at the appropriate time at terminals 22–26.

When power is applied to the solenoid either across terminals 22 and 26, or across terminals 22 and 28 with switch 25 in position to provide power at coil termination 23, then coil 19 will be energized. The solenoid is installed so that normally gravitational influence upon armature 17 will tend to keep it in the lowered position shown in FIG. 1.

The solenoid is shown herein as being attached to cover 31 of the valve assembly 30, the valve assembly being preferably made of bronze, brass or possibly certain types of plastic. Cover 31 is attached by means of screws 31' to body 32 of valve assembly 30. Body 32 has a threaded entry port 33 for connecting a water pipe thereto so that water would flow in direction of arrow 34 into valve assembly 30. Valve assembly 30 also has a threaded exit port 35 into which water distribution pipe (not shown) is connected for passing water through the valve assembly in the direction of arrow 36 to the water distribution system. Valve assembly 30 has a cavity 37 in which the members attached to the lower end of armature 17 are located, and which cavity houses water during passage thereof between entry at 34 and exit at 36. It should be noted that lower cover 15 is mechanically attached to the outer surface of cover 31. Subsequently, armature 17 with sealing members assembled thereon is passed through opening in cover 31 to effect overall assembly of the solenoid and the valve assembly.

Armature 17, therefore has mounted at its extreme lower end member 38 for closing or opening of entry port 33, which member 38 is preferably of a resilient material such as rubber, neoprene or the like, but may also be metallic. Member 38 has a plate 39 with a flanged portion as an integral part thereof used for securing member 38 to armature 17 by means of set screw 40.

Member 38 is normally bonded to metallic portion 39 for achieving better reliability of operation. Part 41' may be a double headed cotter-type pin initially closed on both ends which is passed through a transverse aperture in armature 17 and then the ends of the cotter-type pin are pried open for insertion therein of ends of bias springs 41. The other ends of the bias springs 41 are attached to eye-type members 41" on the upper surface of plate 60. Springs 41 are shown substantially compressed in the inoperative mode of the solenoid in FIG. 1, but when armature 17 under the influence of the magnetic field created by energizing coil 19, is raised upward in direction of arrow 46, springs 41 will expand, setting up a pull or a mechanical bias upon armature 17, which bias during the operative mode of the solenoid is overcome by the larger force of the magnetic field created. But upon deenergizing of coil 19 and collapse of the magnetic field, the bias created by springs 41 will effect a pull upon armature 17 that will overcome the vector forces created by inrushing water at 34 to make possible the closing of port 33 thereby.

A generally flared or concave type gasket 42 is provided at the lower end of armature 17 located in cavity 37 above member 38. Gasket 42 may be preferably of resilient material such as rubber or other composition material. Gasket 42 has a flanged portion 43 as an integral part thereof or molded thereto, with set screw 44 provided in member 43 to enable the securing of gasket 42 to armature 17. Cover 31 is required to have an aperture 45 at the center thereof to permit armature 17 to move therethrough in accordance with excitation of coil 19. Hence, there being water in cavity 37, and water entering the cavity under pressure during activation of the solenoid, when armature 17 thereby tending to be moved upward in the direction of arrow 46, the armature is pulled in position so that the peripheral edges 47 of gasket 42 form a temporary seal with the undersurface 48 of cover 31, thereby preventing water under pressure from escaping through apertures 45 and 16, and causing the electrical and other mechanical components of the solenoid to fail.

Body 32 of valve assembly 30 is generally made of bronze or brass, and is a commonly available component of popular use in sprinkler systems. The only modification required to the valve assembly is to provide aperture 45 of appropriate diameter in cover 31, or to replace cover 31 with one prefabricated with aperture 45 therein.

Figure 4:
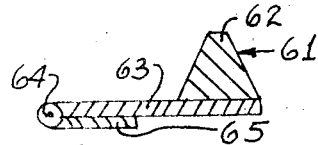
FIG. 4 is a cross section view of a slice of the bar transfer means taken along planes 4—4 and 4'—4' of FIG. 2 showing the bar transfer means in its normal inoperative mode.

Referring to FIGS. 1, 2 and 4, armature 17 is viewed in position wherein valve 30 does not allow water to pass therethrough, and is consequently in the inoperative mode.

In the inoperative mode, pivot bar 50 is positioned wherein it blocks the upper end of armature 17, preventing armature 17 from moving upward in direction of arrow 46, when water under pressure attempts to enter port 33 in direction of arrow 34, as well as accompanied by the slight bias provided by springs 41. This mode is in being during the period of time when power is not applied to coil 19.

Pivot bar 50 is pivotably held by means of pivot pin 51, which pin is vertically embedded in sidewall 10 material, pin 51 extending in slot 51' therein. Pivot pin 51 retains one end of a reasonably heavy spring 52 for urging pivot bar 50 to remain in its normal position across the upper end face of armature 17. The pivot pin assembly is located in a recessed portion 53 of sidewall 10. The other end of the pivot bar is located in a recessed portion 54 in sidewall 11, and has an aperture 55 therein to which a spring 56, normally compressed, is attached, the other end of the spring being attached to a spring receiving member 57 molded in sidewall 11.

Plate 60 is preferably made of magnetic material such as soft iron. Plate 60 has an aperture substantially at its center and extending in a U-shaped configuration into sidewall 12, for permitting free motion of armature 17 through the center portion of the aperture in plate 60, and this plate is also inserted in slot provided in wall 10, as well as in wall 12, illustrating that these walls are capable of retaining same. But, this plate may be held in a variety of other ways if desired.

Pivot bar translation means 61 is generally of soft iron and comprises a conically-shaped member 62 attached to a flat member 63 hinged by means of hinge 64 to another flatly-shaped member 65, and member 65 is attached to plate 60.

Hence in FIGS. 2 and 4 the pivot bar translation means 61 has faces of members 63 and 65 in cooperative relationship, so that in effect the narrowest portion of cone 62 abuts an edge of pivot bar 50, in which position, spring 52 urging pivot bar 50 to want to pivot in a counterclockwise direction as viewed in FIG. 2, and no power being applied to coil 19, armature 17 is force-held by pivot bar 50 in a downward direction indicated by arrow 70, due to cooperation of a face of the pivot bar with the upper end face of the armature, and therefore port sealing member 38 will maintain port 33 closed.

Figure 5:
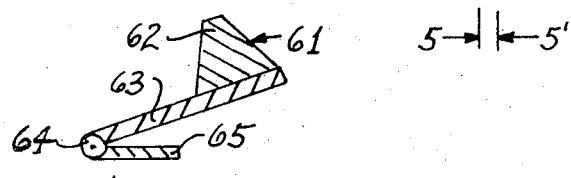
FIG. 5 is a cross section view of the slice of the bar transfer means taken along planes 5—5 and 5'—5' of FIG. 3 showing the bar transfer means in its operative mode.

Referring to FIGS. 1, 3 and 5, and when power is applied to coil 19, keeping in mind that the relative moment of inertia of the armature with members 38 and 42 thereon is substantially greater than that of cone 62 and plate 63 of the pivot bar translation means, the magnetic field set up by coil 19, the direction of winding of the coil, and if D.C. power is used, the direction of current flow in coil 19, all this having been taken into account, upward motion of armature 17 in the direction of arrow 46 will result, providing upward motion upon pivot bar translation means 61 to cause cone 62 with plate 63 attached thereto to pivot upwardly, as shown in FIG. 5. But the moment of inertia of an object as small as the pivot bar translation means as compared with the relatively large and heavy armature, the pivot bar translation means movement will occur prior to that of the armature, thereby translating or pivoting the pivot bar by virtue of the edge of the pivot bar being in cooperation with the edge of cone 62, and the change from cooperation of the edges at the small portion of cone 62 to the larger portion thereof, will correspondingly pivotably translate pivot bar 50 to the position thereof as shown in FIG. 3, thereby expanding and imposing tension on spring 56, shown in FIG. 3 in its expanded form. Recess 54 is sufficiently wide to accommodate motion of pivot bar for the angle of pivot required, so that pivot bar clears the armature. The relatively sluggish armature will therefore be delayed in time compared with the motion of the combination cone and plate of the pivot bar translation means 61, although the magnetic field resulting will permeate both of these magnetically susceptible components at the same time. Such delay is more than sufficient to assure reliable operation of the two solenoid components (61 and 17) relative to each other. Upon subsequent upward motion of armature 17 in direction of arrow 46, gasket member 42 will by means of its peripheral edge 47 abut the inner surface of cover 31, seal aperture 16 or rather the path thereto, so that water flowing into port 33 in direction of arrow 34 will fill cavity 37 and flow through port 35 in direction of arrow 36 while the armature 17 is held in its upward position by the field during electrical activation of coil 19. In the upward position, an edge of the pivot bar will cooperate with a portion of the outer peripheral surface of the armature.

In such upward position, additional mechanical bias will have been created by expansion of springs 41 (springs 41 are only shown in FIG. 1), but such mechanical bias while affording a downward pull upon armature 17 in direction of arrow 70, is insufficient to overcome the magnetic field acting upon the armature to maintain it in its upward position, thus allowing water to flow through the system during the operate mode of the solenoid.

Upon removal of power from coil 19, the magnetic field created will collapse, and the mechanical bias residual in springs 41, now expanded, will operate to pull the armature downward in direction of arrow 70 in the presence of the opposing vector forces acting upon members 38 and 42 due to water inflow at 34 through port 33.

Upon execution of downward motion of armature 17 to close port 33 again, the mechanical bias constantly present to one degree or another in spring 52 and acting upon pivotable bar 50 and assisted by the mechanical bias created by expansion of spring 56, both springs 52 and 56 will effect a pullback of bar 50 to its normal position, since under these circumstances, cone 62 will have returned to its position shown in FIG. 4 and the edge of bar 50 will no longer abut armature 17, so that there is nothing to prevent the action of springs 52 and 56 to restore bar 50 to its normal inoperative mode wherein it blocks the upper end face of armature 17 and thereby prevents upward motion thereof until coil 19 is again energized.

Of course, the upper portion of the rectangular cavity formed by sidewalls 10, 11, 12 and 13 are closed by means of plastic cover 14 attached thereto.

It is noted, that if the pressure of water inflow at 34 through port 33 could be relied upon to always be the same, which it would not, then armature 17 and/or members which it bears, such as gasket 42 and member 38 can be made sufficiently heavy to overcome the water inflow pressure, and neither bias springs 41 nor the pivot bar 50 and associated return springs would be required. Alternatively to making armature 17, gasket 42 and member 38 heavier, the plate 39 attached to member 38 could be made of heavier metal such as lead, or made of thicker metal, or an additional member similar in structure to member 38-39 but made of a heavy metal, such as lead, could be mounted on armature 17 between member 38 and gasket 42. However, the changing water pressures prevelant in water supply systems serving a community, changing with time of the day due to greater usage or lesser usage by subscribers, makes the more exotic mechanical bias version of the solenoid more advantageous due to independence of external water pressure which may suddenly rise beyond the highest design limits of a solenoid not having these mechanical bias features built in, and hence make the solenoid inoperative at those exceeded pressures, which problem is thus avoided by inclusion of the aforementioned mechanical bias.

Also to be noted that the use of pivot bar 50, makes it unnecessary to employ extremely heavy bias or return springs such as springs 41, it only being necessary to momentarily close port 33 whereupon the armature having dropped into place, pivot bar 50 having returned to its inoperative mode, locks-in the armature.

It should also be noted that although springs 52 and 56 were used to provide mechanical bias for return of pivot bar 50 to its normally inoperative position, only one of these springs is actually necessary to provide the required function; two were used to effect greater reliability of operation.

With respect to the biasing action provided for armature 17 as shown in FIG. 1, wherein springs 41 were illustrated as expanding upon lift of the armature when coil 19 is energized due to the resulting magnetic field, it should be noted that the effect of these springs 41 could be simulated with an additional weight mounted on armature 17. Such weight could be mounted where convenient, either at the upper portion or at the lower portion between members 38 and 42, and be in the form of member 38, except that it would be made of a heavy material such as lead. The difference in the permanent weighting and the use of springs, is that in the former the magnetic field has to work harder, that is to say a larger or stronger magnetic field would have to be provided, whereas that is not the case in the latter situtation in that the springs are substantially unexpanded when the field is first generated, substantially zero effort is demanded of the field to begin to expand, but such effort is increased reaching a maximum at the most extreme translation upward of the armature, corresponding with the maximum expansion of the springs. In total, this latter action of the field upon the springs could be mathematically stated as an integral function, whereas in the former case of the weights it is a constant, and the total energy demanded for spring expansion over the time it takes to so expand is substantially less than the energy required to lift the requisite weight.

It may therefore be seen, that the weight of the armature and such members that it carries, if the total were sufficiently heavy, could constitute a constant bias means.

I claim:
1. A self locking solenoid, comprising in combination:
   a magnetizable member responsive to a magnetic field for enabling translation of said magnetizable member;
   a coil circumjacent at least a portion of the magnetizable member for providing said magnetic field during an energized state of said coil; and
   an elongated pivotable member orthogonal to direction of translation of the magnetizable member for blocking the path of translation of said magnetizable member during deenergized state of the coil and for unblocking said path of translation during the energized state of said coil.
2. The invention as stated in claim 1, including:
   pivotable means, in cooperative relationship with the elongated pivotable member, for providing translation action to the elongated pivotable member during the energized state of the coil.
3. The invention as stated in claim 1, including:
   first bias means attached to the magnetizable member for returning the magnetizable member to its pre-operative location subsequent to the termination of the energized state of the coil.
4. The invention as stated in claim 2, including:
   second bias means attached to the pivotable means for creating return action of the pivotable means to its pre-operative position upon completion of the energized state of the coil.
5. The invention as stated in claim 3, wherein: said first bias means comprises spring means.
6. The invention as stated in claim 4, wherein: said second bias means comprises at least one spring.
7. The invention as stated in claim 2, wherein the pivotable means comprises:
   a tapered member; and
   a hinged flat member, the largest portion of the tapered member being attached to a surface of the hinged flat member.
8. The invention as stated in claim 1, including:
   a sealing member attached to the magnetizable member for sealing a portion of the solenoid during the energized state of the coil.
9. The invention as stated in claim 1, including:
   a valve member attached at one end of the magnetizable member.
10. The invention as stated in claim 3, wherein:
   said first bias means including self-biasing action of the magnetizable member by virtue of additional weight contributed by said magnetizable member.

* * * * *